United States Patent [19]

Nolan et al.

[11] Patent Number: 4,983,195
[45] Date of Patent: Jan. 8, 1991

[54] METHOD OF MAKING FIBER OPTIC COUPLER WITH LONGITUDINAL PROTRUSIONS

[75] Inventors: Daniel E. Nolan; Gregory E. Williams, both of Corning, N.Y.

[73] Assignee: Corning Incorporated, Corning, N.Y.

[21] Appl. No.: 461,100

[22] Filed: Jan. 4, 1990

[51] Int. Cl.⁵ ............................................. C03B 23/20
[52] U.S. Cl. ................................ 65/4.2; 350/96.15; 65/4.21; 65/3.11
[58] Field of Search ............. 65/3.11, 3.2, 4.2, 4.21, 65/4.3, 109, 110, 2, 12, 157, 292, 374.15; 350/96.15

[56] References Cited

U.S. PATENT DOCUMENTS

| | | | |
|---|---|---|---|
| 3,579,316 | 5/1971 | Dyott et al. | 65/4.21 |
| 3,932,162 | 1/1976 | Blankenship | 65/3.12 |
| 4,179,186 | 12/1979 | Tynes | 156/158 |
| 4,213,557 | 7/1980 | Franzen et al. | 65/110 |
| 4,291,940 | 9/1981 | Kawasaki et al. | 65/4.2 |
| 4,377,403 | 3/1983 | McLandrich | 65/4.21 |
| 4,392,712 | 7/1983 | Ozeki | 350/96.15 |
| 4,410,346 | 10/1983 | Aulich et al. | 65/4.2 |
| 4,426,215 | 1/1984 | Murphy | 65/4.21 |
| 4,439,221 | 3/1984 | Smyth et al. | 65/4.21 |
| 4,490,163 | 12/1984 | Jochem et al. | 65/4.2 |
| 4,591,372 | 5/1986 | Bricheno et al. | 65/4.2 |
| 4,704,151 | 11/1987 | Keck | 65/4.1 |
| 4,726,643 | 2/1988 | Imoto et al. | 350/96.16 |
| 4,902,323 | 2/1990 | Miller et al. | 65/3.11 |
| 4,902,324 | 2/1990 | Miller et al. | 65/3.11 |

FOREIGN PATENT DOCUMENTS

| | | |
|---|---|---|
| 55-146409 | 11/1980 | Japan . |
| 56-126817 | 10/1981 | Japan . |
| 59-195615 | 11/1984 | Japan . |
| 59-195617 | 11/1984 | Japan . |
| 60-154215 | 8/1985 | Japan . |
| 61-226712 | 10/1986 | Japan . |
| 62-17709 | 1/1987 | Japan . |
| 53-217313 | 9/1988 | Japan . |
| 0113104 | 1/1989 | Japan . |

OTHER PUBLICATIONS

Dyott et al., Polarization Holding Directional Couplers Using D Fiber, SPIE vol. 479, 1984, pp. 23–27.

Primary Examiner—Kenneth M. Schor
Assistant Examiner—John J. Bruckner
Attorney, Agent, or Firm—William J. Simmons, Jr.

[57] ABSTRACT

An overclad fiber optic coupler is formed from a coupler preform including a glass tube having a longitudinal aperture. The aperture is formed of a plurality of similarly shaped side walls, each of which includes a longitudinally extending, inwardly projecting protrusions. The region between each two adjacent protrusions constitutes a corner region. Disposed within the aperture are at least a portion of each of a plurality of glass optical fibers, one fiber being situated in each corner region. The midregion of the tube is collapsed onto the fibers, the protrusions maintaining the fibers in their relative positions. At least a portion of the midregion is stretched to reduce the tube midregion diameter.

19 Claims, 3 Drawing Sheets

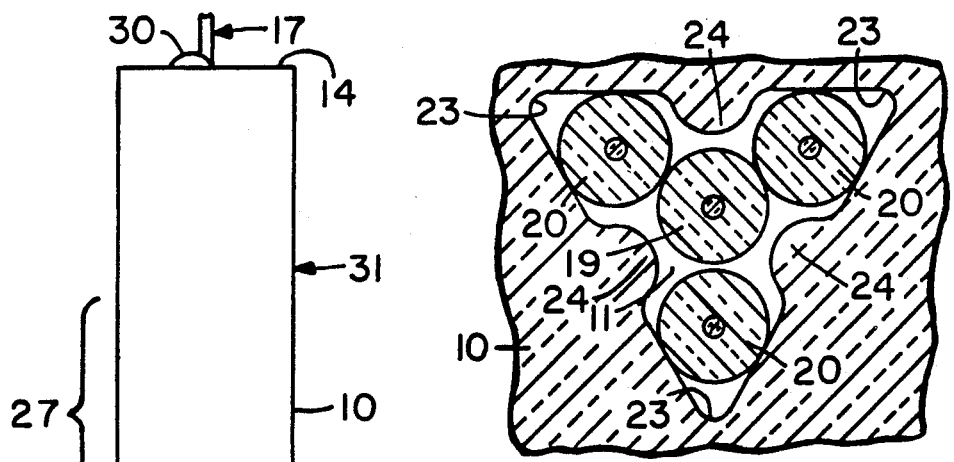
Fig. 3
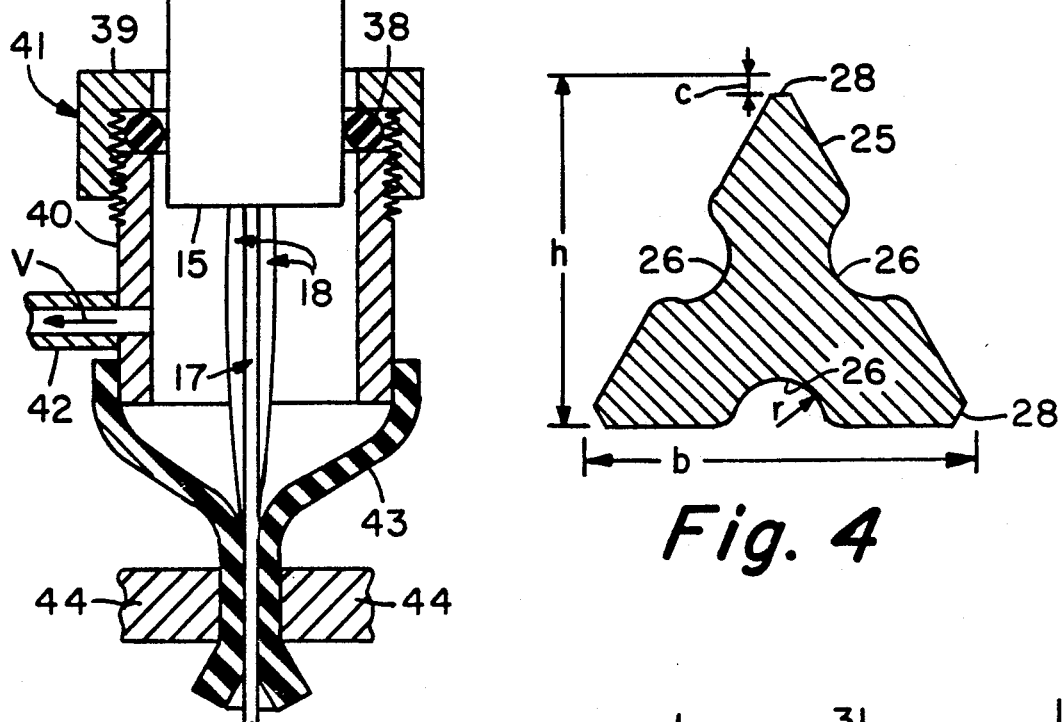
Fig. 4
Fig. 1
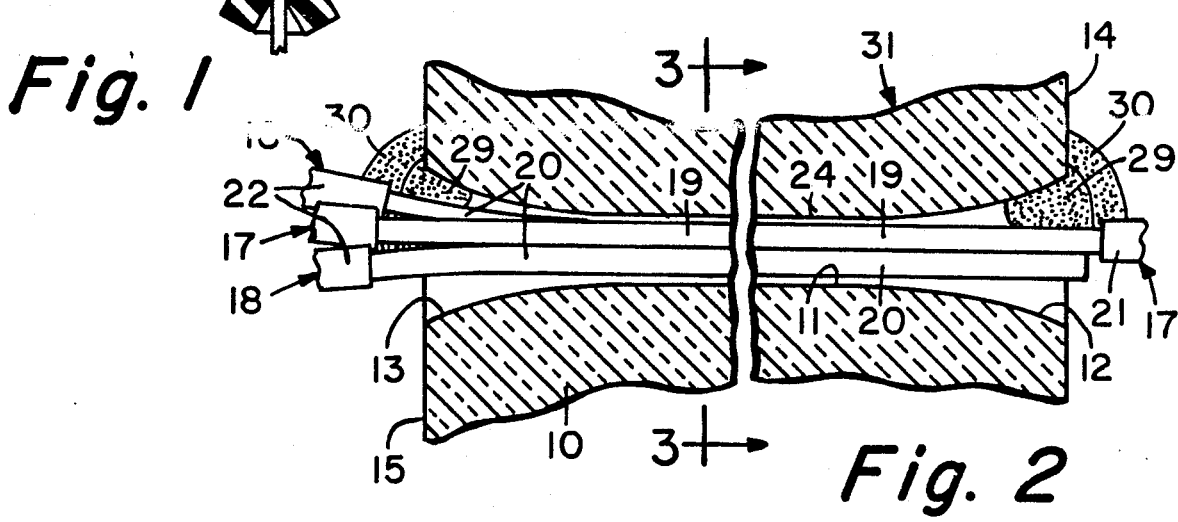
Fig. 2

METHOD OF MAKING FIBER OPTIC COUPLER WITH LONGITUDINAL PROTRUSIONS

CROSS-REFERENCE TO RELATED APPLICATION

This application is related to the following U.S. Pat. Applications: S.N. 223,423 entitled "Method of Reproducibly Making Fiber Optic Coupler" (W.J. Miller et al. 1-2) filed July 25, 1988, now U.S. Pat. No. 4,902,324; S.N. 380,877 entitled "Method of Making Fiber Optic Couplers" (G.E. Berkey et al. 18-1-1) filed July 17, 1989; and S.N. entitled "1×N Fiber Optic Coupler and Method" (W.J. Miller et al. 4-9-1) filed on even date herewith.

BACKGROUND OF THE INVENTION

This invention relates to methods of making 1×N fiber optic couplers that are capable of coupling substantially equal amounts of power from an input optical fiber to two or more output optical fibers.

Methods of making 1×N couplers are disclosed in said related U.S. Pat. application S.N. 380,877. Protective coating is removed from a region of an input optical fiber intermediate the ends thereof, and protective coating is removed from an end of each of a plurality of output optical fibers. The coated portion of the input fiber is threaded through the aperture of a capillary tube until the uncoated region thereof is near the tube end. The uncoated regions of the output fibers are placed around that of the input fiber, and the uncoated regions of all of the fibers are simultaneously fed into the tube aperture until the uncoated regions extend through the midregion of the tube. In order to equally space the output fibers around the input fiber, the uncoated sections of the output fibers are glued to the input fiber prior to inserting the fiber bundle into the tube. The tube midregion is heated to collapse it about the fibers, and the central portion of the midregion is drawn to reduce the diameter thereof over a predetermined length.

Said related application S.N. 223,423 teaches that tubes having bores of predetermined cross-section can be employed to facilitate the alignment of the output fibers around the centrally-disposed input fiber prior to the tube collapse step. The aperture is formed by a plurality of flattened walls, the dimensions and orientations of which are such that the cross-section of the aperture in the central region of the tube is symmetrical with respect to a plane passing through the longitudinal axis of the tube. At any cross-section of the aperture that is adjacent the coated regions of the fibers, each fiber coating contacts two walls of the aperture. The midregion of the tube is heated and collapsed about the fibers, and the central portion of the midregion is drawn to reduce the diameter thereof. For example, four fibers can be positioned in a triangularly shaped bore, three of the fibers being equally spaced about a central fiber. After the tube collapse step, the peripherally disposed fibers are not always equally spaced about the central fiber.

SUMMARY OF THE INVENTION

It is an object of the present invention to provide a method of making an overclad 1×N fiber optic coupler wherein a plurality of output fibers remain equally spaced about an input fiber after the overclad tube has been collapsed onto the fibers. Another object is to provide a reproducible method of making 1×N overclad fiber optic couplers. A further object is to provide a method of reproducibly making 1×N fiber optic couplers of the type wherein the input signal is equally coupled to the output fibers.

Overclad fiber optic couplers are conventionally formed from a coupler preform including a glass tube having a longitudinal aperture. Disposed within the aperture are at least a portion of each of a plurality of glass optical fibers. At least that part of each fiber that is located in the tube midregion has no coating. The midregion of the tube is collapsed onto the fibers, and at least a portion of the midregion is stretched. In accordance with this invention, the tube is characterized in that the aperture has M equally spaced, longitudinally extending, inwardly projecting protrusion means (M>2). The region between each two adjacent protrusion means constitutes a corner region through which one of the fibers extends. The protrusion means maintains the fibers in their relative positions during the tube collapse step.

The tube aperture may be formed of M similarly shaped side walls, adjacent walls intersecting at an apex, and each of the walls including one of the protrusion means. If M+1 fibers are to be disposed in the aperture, M fibers are disposed in the corner regions, and one fiber is centrally disposed in the aperture in substantial contact with the M fibers. In that embodiment wherein M is greater than 6, the diameter of the centrally disposed fiber is greater than the diameters of the M fibers.

The glass tube can be formed by inserting into the aperture of a first tube an elongated carbon member having a predetermined cross-sectional shape. The first tube is heated, and a differential pressure is created across the wall thereof to cause the tube to collapse onto the carbon member. The carbon member is removed by oxidation, and the resultant tube is drawn to reduce the diameter thereof.

Glass optical fibers are conventionally provided with protective coatings. A portion of the coating is stripped from each coated fiber, and the uncoated portions of the fibers are placed within the longitudinal aperture. In one embodiment, M+1 coated glass fibers are employed. A portion of the protective coating is stripped from a region of one of the fibers remote from the ends thereof, and a portion of the coating is stripped from the ends of the remaining M fibers. The uncoated sections of the one and the M fibers are placed within the tube aperture. The one fiber can be located in one of the corner regions of the aperture, or it can be located in center of the aperture.

BRIEF DESCRIPTION OF THE DRAWINGS

FIG. 1 is a partial cross-sectional view of a coupler preform attached to an evacuation apparatus.

FIG. 2 is a cross-sectional view of the axial portion of the preform of FIG. 1.

FIG. 3 is a cross-sectional view taken along lines 3—3 of FIG. 2.

FIG. 4 is a cross-sectional view of a carbon aperture forming member.

DESCRIPTION OF THE PREFERRED EMBODIMENTS

Figure 5:
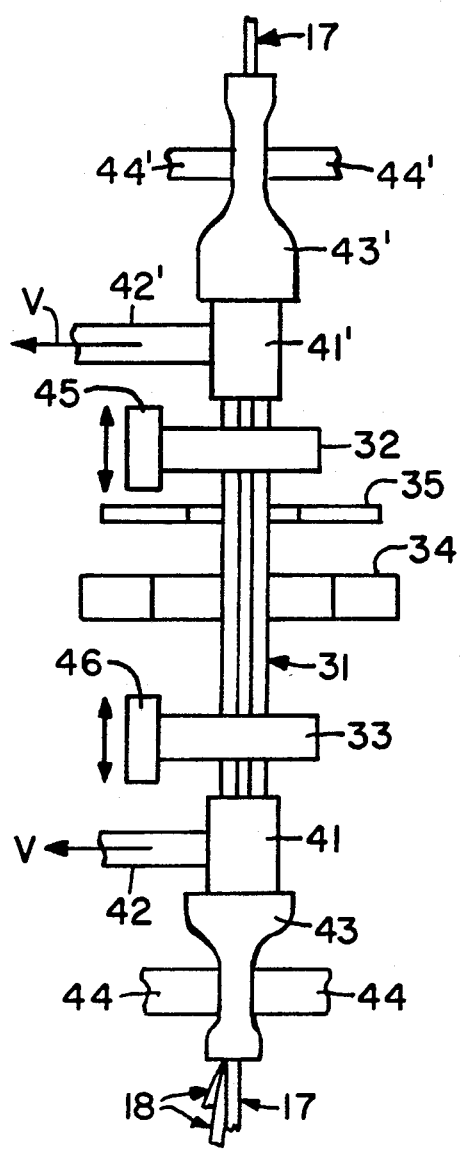
FIG. 5 is a schematic illustration of an apparatus for collapsing a coupler preform and drawing the midregion thereof.

The drawings are not intended to indicate scale or relative proportions of the elements shown therein.

A first embodiment pertains to an improved method of making 1×4 fiber optic couplers. This method employs a tube 10 (FIG. 1–3) having a longitudinal bore or aperture 11. Tapered apertures 12 and 13 form funnel-like entrances to aperture 11 at end surfaces 14 and 15, respectively. The softening point temperature of tube 10 should be lower than that of the fibers that are to be inserted therein. Suitable tube compositions are $SiO_2$ doped with up to 25 wt. % $B_2O_3$, 8–10 wt % being preferred. Fluorine can optionally be employed in addition to the $B_2O_3$. Tube 10 can be formed by depositing glass particles on a cylindrical mandrel to form a porous, cylindrical preform. The mandrel is removed, and the porous preform is dried and consolidated to form a tubular glass body.

The optical fibers must be maintained in a symmetrical array within the coupling region of the coupler in order to obtain proper coupling in a 1×N coupler. The geometry of the tube aperture is a critical factor in maintaining the fibers in such a symmetrical array. In accordance with the present invention the tube aperture has an equiangular polygonal cross-sectional configuration. If the aperture has an M sided polygonal cross-section, it is formed of M similarly shaped side walls, each of which includes longitudinally extending, inwardly projecting protrusion means for collapsing inwardly on the peripherally located fibers and maintaining their relative positions during the tube collapse step. Adjacent aperture walls intersect at an apex, thereby forming a corner region through which one fiber extends in substantial contact with the adjacent walls. By substantial contact is meant that amount of contact that might occur, taking into consideration the fact that the fiber must be slightly smaller than the space alloted to it to account for manufacturing tolerances. Such an M-sided cross-section can symmetrically support an array of M fibers or an array of M+1 fibers. If M fibers are present, one is disposed in each corner, and each fiber contacts the two adjacent fibers. If M+1 fibers are present, one fiber is disposed in each of the M corners, and one additional fiber is disposed in the center of the M fibers.

Aperture 11 of FIGS. 1–3 comprises three similarly shaped walls that intersect at corners 23. At the centers of the three walls are inwardly projecting, longitudinally extending protrusions 24. A triangular aperture is suitable for making couplers having four fibers (FIG. 3), or it could be used to support three mutually contacting fibers if it were suitably dimensioned with respect to the fiber diameters.

A glass tube having an aperture of the type illustrated in FIG. 3 can be formed by shrinking a tube onto a carbon graphite member 25 having the cross-sectional shape shown in FIG. 4 and then burning out the carbon member and stretching the tube to decrease its diameter. The carbon member surface should be free from impurities that would cause imperfections in the glass surface within the aperture. The details of this process are disclosed in U.S. Pat. No. 4,750,926, which is incorporated herein by reference.

Tapered apertures 12 and 13 can be formed by flowing the gas phase etchant $NF_3$ through the tube while directing a flame toward the end of the tube to create an axial temperature gradient. The tapered apertures form funnel-like entrances to bore 11 to facilitate fiber insertion.

Coated fiber is utilized in the present method, such coated fiber comprising a glass optical fiber and a protective coating. The glass optical fiber includes a core of refractive index $n_1$ and a cladding having a refractive index $n_2$ ($n_1 > n_2$) There is cut a length 17 of coated fiber comprising glass optical fiber 19 and coating 21. A portion of the coating intermediate the ends of coated fiber 17 is removed for a distance slightly longer than the length of tube 10.

Three lengths 18 of coated fiber are severed; each of the lengths comprises a glass optical fiber 20 having a protective coating 22. A portion of the coating at an end of each coated fiber 18 is removed. Each of the uncoated ends is optionally provided with an antireflection termination. One method of forming such terminations is disclosed in U.S. Pat. No. 4,834,493. In accordance with a modification of the method of that patent, an oxygen-acetylene flame is directed at the uncoated fiber a short distance from the end thereof, and the end of the fiber is pulled until it becomes severed from the remainder of the fiber. The fiber now has a tapered end. The fiber end remote from the tapered end is connected to a reflectance monitoring apparatus. The tapered end is provided with a low reflectance termination by heating the tapered end in a flame to lower the viscosity of the material thereof by an amount sufficient to cause the material to recede back along the fiber and form a rounded endface, the final diameter of which is about equal to or slightly smaller than the original uncoated fiber diameter. A current specification for the reflected power is −50 dB. The uncoated sections of fiber 18 that remain after the termination step are slightly longer than tube 10.

Various techniques can be employed for threading the fibers into aperture 11. In accordance with one technique, tube 10 is mounted horizontally in a jig with one of the aperture corners 23 oriented downwardly. All fibers are inserted into that portion of aperture 11 which extends to tube end 15. The exposed portion of one fiber 20 is inserted into the lower portion of aperture 11 such that it contacts the aperture walls intersecting in the downwardly oriented corner. One of the coated end portions of coated fiber 17 is then threaded through the central portion of aperture 11 until the uncoated central region of optical fiber 19 is centered in the tube. The coated portion of the fiber fits through the aperture at this time since the remaining two corners of the aperture are open. The exposed portions of the remaining two fibers 20 are inserted into the remaining open regions of aperture 11 between fiber 19 and the aperture walls that form the remaining two corners. Preferably, only a few micrometers of clearance exists between adjacent fibers and/or the fibers and walls. The cladding portions of the fibers are a few millimeters from the tube endfaces 14 and 15. Drops 29 of glue are applied to optical fibers 19 and 20 at both ends of the tube to glue the fibers to one side of the aperture. Care is taken not to block access to aperture 11. This glue cures to a viscosity such that the fibers are rigidly secured to the tube. Thereafter, drops 30 of glue are applied to cover any exposed portions of stripped fiber. Again, care is taken not to block access to aperture 11. Glue 30 cures to a consistancy that is less rigid than glue 29.

Apparatus for collapsing and stretching the resultant preform 31 is shown in FIG. 5. Chucks 32 and 33 are mounted on motor controlled stages 45 and 46, respectively, which are preferably controlled by a computer. A heat shield 35 is optionally located above the ring burner 34. Preform 31 is inserted through ring burner 34 and is clamped to the draw chucks. The fibers extending from both ends of the tube are threaded through their respective vacuum apparatus, and vacuum attachments 41 and 41' are connected to the tube. Vacuum attachment 41, which is shown in cross-section in FIG. 1, may comprise a tube 40, a collar 39 threaded thereon, and an O-ring 38 disposed between the collar and tube. After vacuum attachment 41 is slid over the end of tube 10, collar 39 is tightened, thereby compressing O-ring 38 against the tube. Vacuum line 42 is connected to tube 40. One end of a length of thin rubber tubing 43 is attached to that end of vacuum attachment 41 that is opposite preform 31; the remaining end of the tubing extends between clamp jaws 44. Upper vacuum attachment 41' is similarly associated with line 42', tubing 43' and clamp jaws 44'. The coated portions of the fibers extend from tubing 43 and 43'. Vacuum is applied to both ends of coupler preform 31 by clamping jaws 44 and 44' on tubing 43 and 43', respectively.

Figure 6:
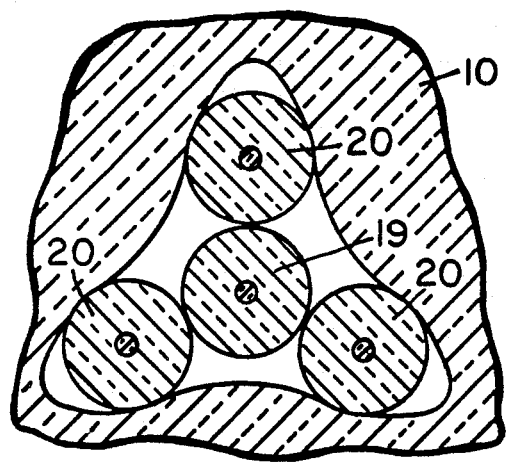
FIGS. 6, 7 and 8 are cross-sectional views of the axial region of the tube during the collapse step.
Figure 7:
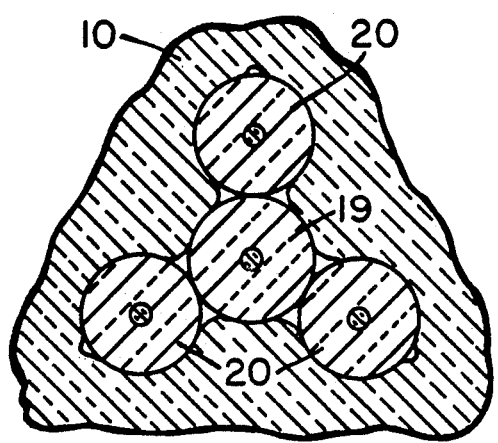
Figure 8:
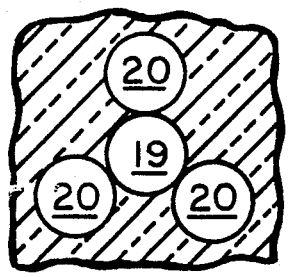

The flame from ring burner 34 heats tube 10 for a sufficient period of time to increase the temperature of midregion 27 of the tube to the softening temperature thereof. With the assistance of the differential pressure on the tube, the matrix glass begins to collapse onto fibers 20, and they are urged into contact with fiber 19 (FIG. 6). The tube matrix glass then begins to surround fiber 19 as shown in FIG. 7. Finally, the tube matrix glass completely surrounds the fibers and fills the aperture to form a solid structure that is free from airlines and the like. Midregion 27, the central portion of which forms the coupling region of the resultant coupler, becomes a solid region (see FIG. 8) wherein substantially the entire lengths of fibers 19 and 20 are in mutual contact. FIG. 8 illustrates the fact that the relative orientation of the fibers is retained throughout the entire collapse step. The longitudinal length of the collapsed region depends upon the temperature and time duration of the flame, the thermal conductivity of the glass tube, and the amount of vacuum applied.

The different stages of partial collapse illustrated in FIGS. 6 and 7 were obtained by collapsing tubes onto fibers by a method similar to that described above except that the applied vacuum was less than that necessary to obtain complete collapse. These figures clearly illustrate the beneficial effect of longitudinal protrusions 24.

After the tube cools, the flame is reignited, and the center of the collapsed region is reheated to the softening point of the materials thereof. The flame duration for the stretch process depends upon the desired coupler characteristics. Stretching only the central portion of the collapsed midregion ensures that the coupling region of the fibers will be embedded in the matrix glass of the capillary tube. During this reheating step, the fibers are also heated since they are completely surrounded by the matrix glass of the capillary tube and are therefore in thermal contact therewith. After the collapsed tube is reheated, the supply of oxygen to burner 34 is turned off, and stages 45 and 46 pull in opposite directions until the coupler length has been increased by an amount necessary to bring the fiber cores closer together along a distance sufficient to accomplish a predetermined type of coupling. The diameter of midregion 27 is reduced as illustrated by region 51 of FIG. 9. The ratio of the drawn down diameter of region 51 to the starting diameter of midregion 27 (the draw down ratio) is determined by the optical characteristics of the particular device being made.

It is conventional practice to monitor output signals to control process steps in the manufacture of optical devices as evidenced by U.S. Pat. Nos. 4,392,712 and 4,726,643, 4,798,436, U.K. Pat. Application No. GB 2,183,866 A and International Publication No. WO 84/04822. Furthermore, computers are often employed in feedback systems which automatically perform such monitor and control functions. A suitably programmed Digital PDP 11-73 micro-computer can be utilized to perform these functions. During the tube collapse and stretch steps, the ends of the tube are affixed to computer controlled stages. The amount of stretching to which the tube must be subjected to achieve given characteristics is initially determined by injecting light energy into the input fiber of a coupler preform and monitoring the output power at one or more of the output fibers during the stretch operation.

If a 1×4 coupler is being formed, a light source can be connected to the input end of fiber 17 extending from preform endface 14, and a detector can be aligned with the output end thereof. During the stretching operation, the detection of a predetermined power at said output end can be used as an interrupt to cause the computer controlled stages to stop pulling the coupler preform.

After having determined the proper stretching distance to achieve predetermined coupling characteristics, the apparatus can be programmed to move the stages that proper stretching distance during the fabrication of subsequent couplers that are to have said predetermined characteristics. The timing sequences that have been used in the fabrication of a particular type of coupler can be entered in a separate multiple command file that the computer recalls at run-time. The collapse and stretch steps that are required to make that particular coupler can be executed in succession by the computer on each coupler preform to reproducibly manufacture couplers. The process parameters that can be controlled by the computer to ensure coupler reproducibility are heating times and temperatures, gas flow rates, and the rate or rates at which the stages pull and stretch the coupler preform. In the formation of a 1×4 coupler, the predetermined output power would be ¼ the input power minus ¼ the total excess device loss, as determined empirically.

If the device that is being made is a 1×4 coupler, for example, the stretching operation is not stopped when the output power decreases to ¼ the input power. Various parts of the system exhibit momentum, whereby stretching of the coupler preform continues after the stage motors are instructed to stop. The coupling ratio therefore changes after the stopping signal is generated. Also, the coupling characteristics may change as a newly formed coupler cools down. Experiments can be performed on a particular type of coupler to determine that coupling ratio which must be used to generate the interrupt signal in order to achieve a predetermined coupling ratio after the device cools.

Figure 9:
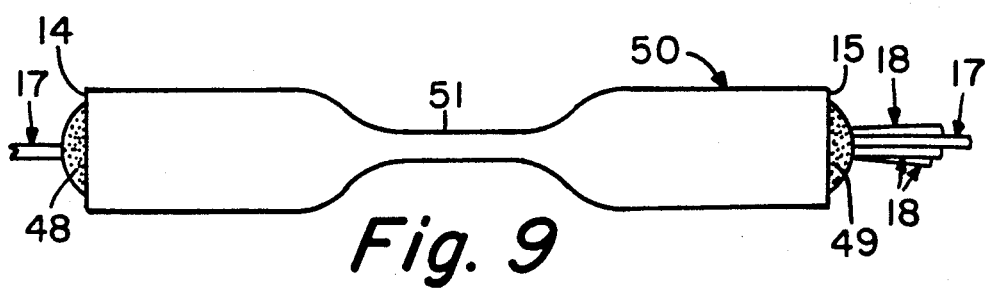
FIG. 9 shows a fiber optic coupler after it has been drawn down and sealed at its ends.

After the coupler cools down, the vacuum lines are removed from the resultant coupler, and quantities 48 and 49 of glue are applied to the ends of the capillary tube (FIG. 9). Glue 48 and 49 is applied over the previously applied glue, and it also fills in the aperture opening that had previously been kept open. This last application of glue increases the pull strength of the fiber pigtails and produces a hermetic seal. The resultant fiber optic coupler 50 of FIG. 9 functions to equally couple a signal propagating in the input end of optical fiber 17 at end 14 to all of the optical fibers extending from end 15. The coupler is then removed from the draw apparatus and can be packaged if additional stiffness is desired.

In a modification of the above-described embodiment, coated fiber 17 extends only from end 14 of tube 10. Rather than being stripped in its central portion, coated fiber 17 would be stripped at its end. Since the resultant device is a $1 \times 3$ coupler, the output power from at least one of the output coated fibers 18 would be monitored during the stretch operation. In this case, the predetermined output power would be $\frac{1}{3}$ the input power minus $\frac{1}{3}$ the total excess device loss.

The $1 \times 3$ coupler embodiment is useful for describing a further modification of the invention. If the input fiber and the three output fibers are identical, the percent power coupled from the input fiber to the output fiber will be wavelength sensitive. For example, about $\frac{1}{3}$ the input power might couple to the output fibers at a predetermined wavelength such as 1310 nm, whereas substantially no power would couple at another wavelength such as 1550 nm. However, if the propagation constants of the output fibers are different from that of the input fiber, the device can be made to function as an achromatic coupler, a wavelength division multiplexer or the like. Various fiber parameters that affect the propagation constant are disclosed in the publication: O. Parriaux et al., "Wavelength Selective Distributed Coupling Between Single Mode Optical Fibers for Multiplexing", Journal of Optical Communications, Vol. 2, No. 3, pp. 105-109.

Figure 10:
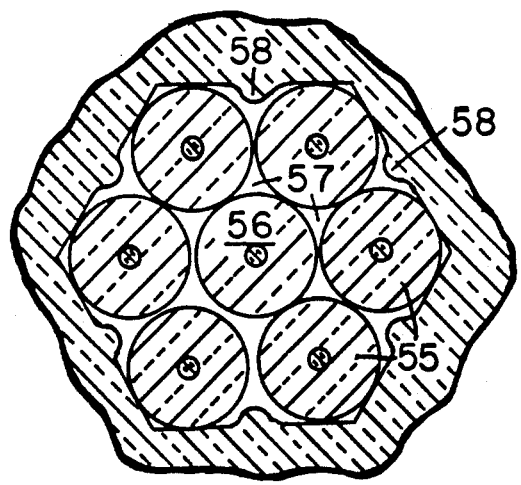
FIGS. 10 and 11 are cross-sectional views illustrating further embodiments of the invention.

If all fibers have the same outside diameter, a maximum of six fibers 55 can be arranged in a close packed array around a central fiber 56 as shown in FIG. 10. Aperture 57 would therefore be formed of six walls, each of which contains an inwardly projecting, longitudinally extending protrusion 58.

Figure 11:
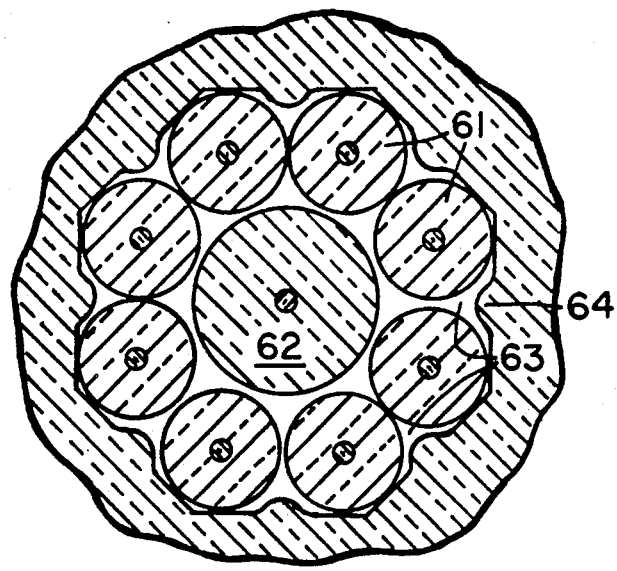

However, more than six fibers of a given diameter can be arranged around a central fiber having a diameter larger than the given diameter. In the embodiment illustrated in FIG. 11, eight fibers 61 of a given diameter are arranged around central fiber 62 having a diameter larger than the given diameter. Aperture 63 is formed of eight walls, each of which contains an inwardly projecting, longitudinally extending protrusion 64. The diameter of the core of fiber 62 could be the same as the diameters of the cores of fibers 61, thus causing the mode field diameters of all of the fibers to be identical. Fiber 62 could therefore be efficiently coupled to a system fiber of standard diameter.

Example 1

The following method was employed to form $1 \times 4$ fiber optic couplers providing substantially equal coupling to each of the output fibers at about 1430 nm.

A glass tube, the composition of which was silica doped with about 10 wt. % $B_2O_3$ was formed by depositing particles on a mandrel to form a cylindrical porous preform. The mandrel was removed, and the porous preform was dried and consolidated to form a tubular glass body having an outer diameter of 37 mm and an inside diameter of 11 mm. A carbon graphite member was machined to the shape shown in FIG. 4. The original cross-sectional dimensions of the carbon member were: h=6.0 mm and b=6.93 mm, the dimension h being measured to the original apex. Semicircular, longitudinally extending grooves 26 having a radius of 0.612 mm were machined in each wall, and the intersection of each groove 26 and its corresponding wall was rounded as shown. The corners were machined down a distance c of 0.254 mm. The carbon member was inserted into the glass tube, and the tube was heated and evacuated in accordance with the teachings of the aforementioned U.S. Pat. No. 4,750,926. The carbon member was burned out of the tube, and the tube was stretched until the height of the resultant triangular cross-sectional aperture was about 365 $\mu$m, this measurement being made from the base of the triangular cross-section to the opposite corner. The flat truncated corners of the carbon mandrel did not carry through to the resultant reduced diameter tube. They appeared as shown in FIG. 3, apparently rounded by one of the heating steps.

The resultant capillary tube was severed into lengths of about 3.8 cm, the outside diameter being about 2.8 mm. Tapered apertures were formed at both ends of the aperture by gas phase etching with $NF_3$. The radii of the tapered apertures at the tube ends are about $\frac{1}{4}$-$\frac{1}{2}$ the tube radius. Tube 10 was cleaned in ethyl alcohol and baked; it was then mounted horizontally in a jig.

Approximately 4.4 cm of coating was stripped from the central region of a 4 meter length of 125 $\mu$m diameter single-mode optical fiber 17 having a 170 $\mu$m diameter urethane acrylate coating. A 4.4 cm long section of coating was removed from the ends of three 2 meter lengths of fiber 18. The uncoated sections of the fibers were wiped. The fibers were threaded into tube 10 as described above, optical fiber 19 being in the center. The cladding portions of the fibers were about 3 mm from the tube endfaces 14 and 15. Drops 29 of Dymax 911 UV curable glue we applied to optical fibers 19 and 20 at both ends of the tube to adhere the fibers to one side of the aperture. After the glue was cured by exposure to ultraviolet light, drops 30 of Dymax 625 UV curable glue were used to cover any exposed portion of stripped fiber. This glue was also cured by exposure to UV light. Care was taken not to block access to aperture 11 while applying the glue.

The tube was secured by chucks 32 and 33 of the apparatus of FIG. 5. The fibers extending from both ends of the tube were threaded through their respective vacuum apparatus, and vacuum attachments 41 and 41' were connected to the tube. Clamps 44 and 44' were released to secure coated fibers 17 and 18, and both ends of the tube were connected to a vacuum source which provided a vacuum of 18 inches (45.7 cm) of mercury. The burner was ignited and the flame heated tube 10 for 10 seconds. Tube 10 collapsed onto the fibers as shown in FIG. 8.

Previous experiments had been performed to determine the amount of stretching necessary to achieve predetermined optical characteristics. During an initial experiment, the input end of fiber 17 was connected to a 1400 nm light source, and the output end thereof was connected to a detector in the feedback system that controlled the movement of chucks 32 and 33. When the signal coupled to the detector indicated that the power propagating in the output end of fiber 17 had decreased to about ¼ its initial value, an interrupt signal was generated for the purpose of stopping the stretching operation. Additional couplers were then made by methods wherein the stretching distance was varied slightly to determine the effects thereof on optical properties. Stretching distance is the total distance that stages 45 and 46 moved away from each other. The stretching distance was found to be between 1.5 cm and 1.6 cm for forming 1×4 couplers of the type to which this example pertains.

Figure 12:
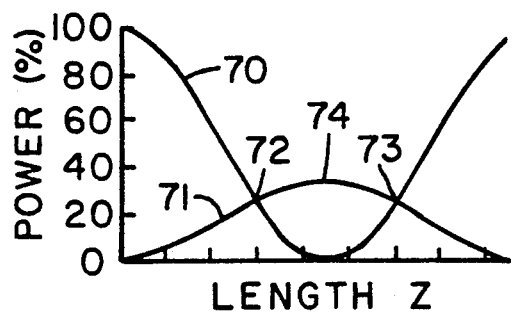
FIG. 12 and 15 are graphs illustrating the variation in coupled power with respect to coupling length during the stretching of two types of 1×4 coupler preforms.

A theoretical analysis was made of couplers of the type to which the present invention pertains in order to better understand such couplers and the method of making them. FIG. 12, which is a result of that analysis, illustrates the manner in which the coupled power varies during the stretching process. Curve 70 indicates that the percent power remaining in the output end of fiber 17 decreases from 100% to zero during the stretching operation. As the power in the output end of fiber 17 decreases, the power in each of the fibers 18 increases (curve 71). The curves of FIG. 12 are not continued any further than the extent necessary to illustrate the specific region of interest, only the first power transfer cycle being shown. If a coupler preform were stretched to greater values of z, the coupled power would continue to oscillate in the manner illustrated except that the period of oscillation becomes smaller with continued stretching. At some length z, the power in each of the output fibers is substantially equal to the power remaining in fiber 17 (see point 72). Continued stretching would result in another value of z wherein equal power propagated in each fiber (see point 73). The monitoring and feedback equipment can cause the stretching to stop at point 72, point 73 or one of the subsequently occurring crossover points (not shown).

Figure 13:
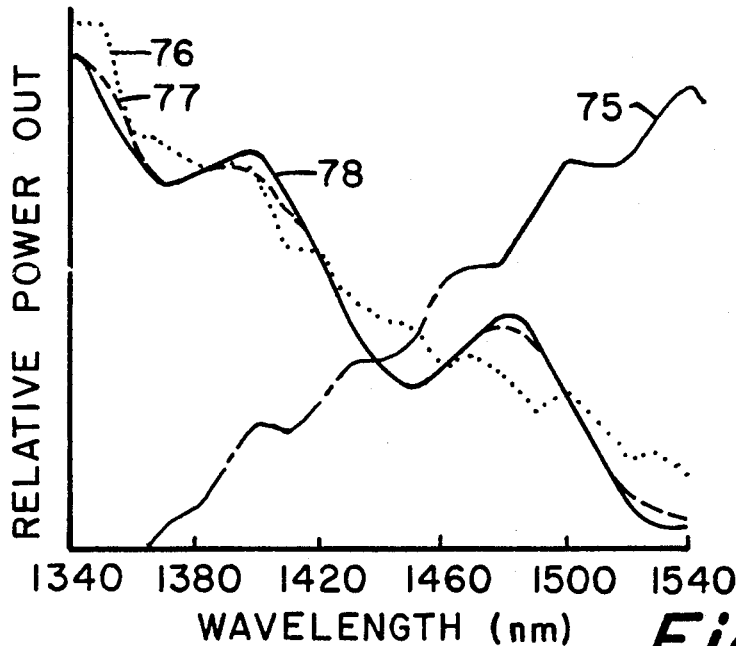
FIG. 13 a spectral diagram illustrating the power in the output fibers of the 1×4 coupler of Example 1.

The midregion of one specific collapsed coupler preform was heated for 9 seconds and was stretched to form the coupler, the total stretching distance being 1.55 cm. After the coupler had cooled, the vacuum lines were removed, and a drop of Emcast 1060A adhesive was applied to the ends thereof to form a hermetic seal. This adhesive was a UV curable epoxy containing ground glass. After the adhesive was cured, the coupler was removed from the draw. Output power is plotted in FIG. 13 as a function of wavelength that coupler. Curve 75 represents the power propagating in the output end of fiber 17, and curves 76, 77 and 78 represent the power propagating in output fibers 18. About equal power propagated in each of the output fibers at 1440 nm. There was very little deviation from this power ratio at wavelengths up to about 1470 nm. The excess loss of this device was 1.24 dB at 1440 nm.

It is noted that a 1×3 coupler could have been formed by stopping the stretching operation at that value of z where no power remains in the output end of fiber 17. The stretching distance would be that value of z corresponding to point 74 of FIG. 12. Curve 71 indicates that each of the fibers 18 contains about 33% of the power propagating in the input end of fiber 17 in a device stretched such a distance.

Example 2

Figure 15:
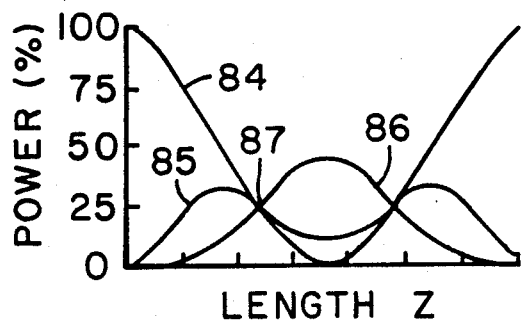
Figure 14:
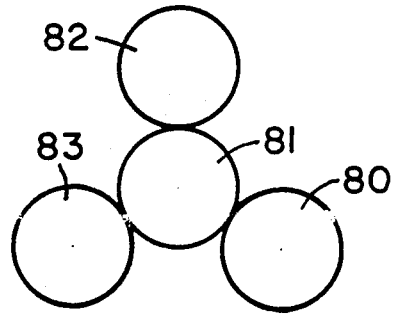
FIG. 14 is a schematic illustration of an alternative arrangement for positioning the input fiber.

A coupler was made by a method similar to that described in Example 1 except that the input fiber 80 (FIG. 14) was placed in one of the corners of the aperture, one output fiber 81 was placed in the center of the aperture, and the remaining output fibers 82 and 83 were placed in the remaining two corners. FIG. 15, which was derived from the aforementioned theoretical model, shows the manner in which coupled power varies during the process of stretching such a preform. Curve 84 represents the amount of power remaining in that portion of input fiber 80 that extends from the output end of the coupler. During the stretching operation, the percent power remaining in that fiber decreases from 100% to zero (curve 84). As the power in the input fiber decreases, the power in the centrally disposed output fiber 81 begins to increase as shown by curve 85. With continued stretching, power begins to couple from central fiber 81 to fibers 82 and 83 (curve 86). At some length z, the power in all output fibers is equal as indicated by point 87 where curves 84, 85 and 86 intersect. In one coupler made in accordance with this embodiment, the power in each of the output fibers was very nearly equal at wavelengths between 1280 and 1310 nm, and the excess device loss was 0.58 dB at 1300 nm.

I claim:

1. A method of making a fiber optic coupler comprising the steps of
    providing a glass tube having first and second opposite end portions and a midregion, a longitudinal aperture extending from a first end of said tube to a second end thereof,
    disposing within the midregion of said longitudinal aperture at least a portion of each of a plurality of glass optical fibers, at least that part of each fiber that is located in the tube midregion having no coating thereon,
    collapsing the midregion of said tube onto said fibers, and
    stretching at least a portion of said midregion,
    said tube aperture having M equally spaced, longitudinally extending, nonplanar inwardly projecting protrusion means, wherein M is at least 3, the region between each two adjacent protrustion means constituting a corner region along which one of said fibers extends, said protrusion means retaining said fibers in their relative positions during said step of collapsing.

2. A method in accordance with claim 1 wherein said tube is characterized in that said aperture is formed of M similarly shaped side walls, adjacent side walls intersecting at an apex, each of said walls including one of said protrusion means.

3. A method in accordance with claim 2 wherein said tube is characterized in that the cross-sectional configuration of said aperture is that of a regular polygon.

4. A method in accordance with claim 1 wherein the step of disposing comprises disposing M+1 fibers in said aperture, M fibers being disposed in said corner regions and one fiber being centrally disposed in substantial contact with said M fibers.

5. A method in accordance with claim 1 wherein the step of disposing comprises disposing M+1 fibers in said aperture, wherein M is greater than 6, the diameter of said centrally disposed fiber being greater than the diameters of said M fibers.

6. A method in accordance with claim 1 wherein said tube is characterized in that the cross-sectional configuration of said aperture is symmetrical about a plane through the longitudinal axis of said tube.

7. A method in accordance with claim 1 wherein the step of providing a glass tube comprises inserting into the aperture of a first tube an elongated carbon member having a predetermined cross-sectional shape, heating said tube and creating across said tube a differential pressure wherein the pressure within said tube is less than that on the outer surface thereof to cause said tube to collapse onto said carbon member, removing said carbon member by oxidation, and drawing the resultant tube to reduce the diameter thereof.

8. A method in accordance with claim 1 wherein the step of disposing comprises providing a plurality of glass fibers having coatings thereon, stripping from each fiber a portion the coating thereof, and disposing the uncoated portions of said fibers within said longitudinal aperture.

9. A method in accordance with claim 1 wherein the step of disposing comprises providing M+1 glass fibers having coatings thereon, stripping from one of said fibers a portion of the protective coating thereof remote from the ends thereof, and stripping from M of said fibers a portion of the coating at one end thereof, and positioning the uncoated sections of said one and said M fibers within said tube aperture.

10. A method in accordance with claim 9 wherein the step of positioning comprises positioning said one fiber in one of said corner regions.

11. A method in accordance with claim 9 wherein the step of positioning comprises positioning each of said M fibers in one of said corner regions and positioning said one fiber in center of said aperture.

12. A method of making a fiber optic coupler comprising the steps of
providing a glass tube having first and second opposite end portions and a midregion, a longitudinal aperture extending from a first end of said tube to a second end thereof, said aperture having M equally spaced, longitudinally extending, nonplanar inwardly projecting protrusion means, wherein M is at least 3,
disposing within the midregion of said longitudinal aperture a plurality of glass optical fibers, each of said fibers extending through said tube midregion, one of said fibers being located between each adjacent pair of protrustion means,
collapsing the midregion of said tube onto said fibers, said protrusion means maintaining said fibers in their relative positions, and
drawing at least a portion of said midregion.

13. A method in accordance with claim 12 wherein said tube is characterized in that said aperture is formed of M similarly shaped side walls, adjacent walls intersecting at an apex, thereby forming a corner region, each of said walls including one of said protrusion means, the step of disposing comprising disposing one of said fibers in each of said corner regions of said aperture.

14. A method in accordance with claim 13 wherein the step of disposing comprises disposing M+1 fibers in said aperture, M fibers being disposed in said corner regions and one fiber being centrally disposed in substantial contact with said M fibers.

15. A method in accordance with claim 13 wherein the step of disposing comprises disposing M+1 fibers in said aperture, wherein M is greater than 6, the diameter of said centrally disposed fiber being greater than the diameters of said M fibers.

16. A method in accordance with claim 13 wherein said tube is characterized in that the cross-sectional configuration of said aperture is symmetrical about a plane through the longitudinal axis of said tube.

17. A method in accordance with claim 13 wherein said tube is characterized in that the cross-sectional configuration of said aperture is that of a regular polygon.

18. A method of making a fiber optic coupler comprising the steps of
disposing a plurality of optical fibers such that at least a part of each fiber extends into the bore midregion of a glass tube, at least that part of each fiber that is located in the tube midregion having no coating thereon,
collapsing said tube midregion onto said fibers, and
stretching the central portion of said midregion,
the step of disposing comprising providing a tube, the bore aperture of which is formed of M similarly shaped side walls, wherein M is at least 3, adjacent side walls intersecting at an apex, thereby forming a corner region along which one fiber extends in substantial contact with the adjacent walls, each of said walls including longitudinally extending, nonplanar inwardly projecting protrusion means for maintaining said fibers in their relative positions during said step of collapsing.

19. A method of making a fiber optic coupler comprising the steps of
providing a glass tube having first and second opposite end portions and a midregion extending between said end portions, a longitudinal aperture extending from a first end of said tube to a second end thereof,
disposing within the midregion of said longitudinal aperture a portion of each of a plurality of glass optical fibers,
collapsing the midregion of said tube onto said fibers, and
stretching at least a portion of said midregion,
said tube aperture being formed of M similarly shaped side walls, wherein M is at least 3, each of said walls having a longitudinally extending, nonplanar inwardly projecting protrusion means, the region between each two adjacent protrustion means constituting a corner region through which one of said fibers extends, said protrusion means maintaining said fibers in their relative positions during said step of collapsing.

* * * * *